(12) United States Patent
Fechtel (10) Patent No.: US 7,693,095 B2
(45) Date of Patent: Apr. 6, 2010

(54) APPARATUS AND METHOD FOR COMPENSATING FOR FREQUENCY / PHASE PULLING BURSTS IN RECEIVED OFDM SIGNALS

(75) Inventor: Stefan Fechtel, Zorneding (DE)

(73) Assignee: Infineon Technologies AG, Neubiberg (DE)

( * ) Notice: Subject to any disclaimer, the term of this patent is extended or adjusted under 35 U.S.C. 154(b) by 868 days.

(21) Appl. No.: 11/485,808

(22) Filed: Jul. 13, 2006

(65) Prior Publication Data

US 2008/0013442 A1 Jan. 17, 2008

(51) Int. Cl.
*H04B 1/44* (2006.01)
(52) U.S. Cl. ..................................................... 370/282
(58) Field of Classification Search ......... 370/276–278, 370/282, 295, 310, 464, 465; 455/73, 78
See application file for complete search history.

(56) References Cited

U.S. PATENT DOCUMENTS

| | | | | |
|---|---|---|---|---|
| 6,058,121 A * | 5/2000 | Kim et al. | ..................... | 370/480 |
| 6,477,148 B1 * | 11/2002 | Gardenfors et al. | ......... | 370/280 |
| 6,625,227 B1 * | 9/2003 | Shull et al. | ................... | 375/295 |
| 6,633,616 B2 * | 10/2003 | Crawford | ..................... | 375/326 |
| 6,798,738 B1 * | 9/2004 | Do et al. | ....................... | 370/210 |
| 7,159,236 B2 * | 1/2007 | Abe et al. | .................... | 725/111 |
| 7,289,765 B2 * | 10/2007 | Okada et al. | .................. | 455/45 |
| 7,346,131 B2 * | 3/2008 | Galperin et al. | ............. | 375/343 |

OTHER PUBLICATIONS

F. Daffara, O. Adami; "A novel carrier recovery technique for orthogonal multicarrier system", Eur. Trans. Telecommun., vol. 8, No. 4, pp. 323-334; Jul. 1996.
J. van de Beek et al.; "ML estimation of time and frequency offset in OFDM systems"; IEEE Trans. Signal Processing; vol. 45; pp. 1800-1805; Jul. 1999.
M. Speth et al.; "Optimum receiver design for wireless broad-band systems using OFDM—Part I", IEEE Trans. Comm., vol. 47, No. 11, Nov. 1999.
M. Speth et al.; "Optimum receiver design for wireless broad-band systems using OFDM—Part II: A case study", IEEE Trans. Comm., vol. 49, No. 11, Apr. 2001.
Complex Valued Multiplier and Accumulator, Knowledge Bridge No. 31, Jan. 2003, ISSN 1606-9536.
Wikipedia Definition of DVB-T, available at http://en.wikipedia.org/wiki/DBV-T.

* cited by examiner

*Primary Examiner*—Dmitry H Levitan
(74) *Attorney, Agent, or Firm*—Lee & Hayes, PLLC (57) ABSTRACT

A method and apparatus is provided for processing a received orthogonal frequency division multiplexing (OFDM) signal at a receiver, wherein said signal has been distorted by one or more transmission bursts from a transmitter. The method and apparatus generate a phase compensated OFDM signal based upon a pre-fast fourier transform (pre-FFT) phase progression estimate and information regarding timing of the one or more transmission bursts.

33 Claims, 5 Drawing Sheets

APPARATUS AND METHOD FOR COMPENSATING FOR FREQUENCY / PHASE PULLING BURSTS IN RECEIVED OFDM SIGNALS

FIELD OF THE INVENTION

The present invention relates to the field of OFDM signal receivers.

BACKGROUND OF THE INVENTION

Orthogonal Frequency Division Multiplexing (OFDM) is a multi-carrier transmission technique, where a single data stream is transmitted over a number of lower rate subcarriers (SCs). An OFDM signal includes a plurality of symbols. Each symbol includes a guard interval ("GI"), which is a copy of the latter (or last) segment ("LS") of the OFDM signal. The GI thus serves as a cyclic prefix used by the OFDM receiver to demodulate the signal.

Multimode handheld devices can obtain embedded modules which support cellular services, e.g., speech via GSM/GPRS Groupe Special Mobile (Global System for Mobile communications)/(General Packet Radio Service), and other services, e.g., reception of DVB-T/H (Digital Video Broadcasting—Terrestrial/Handheld) digital television or IP datastreams. A transmission burst from one of these services on a device can disturb the receipt and processing of an OFDM signal for another services on the device.

DETAILED DESCRIPTION OF THE INVENTION

In accordance with the present invention, an apparatus and method is provided to compensating for frequency/phase pulling bursts in an OFDM signal. This problem typically arises in multimode devices which transmit a bursty signal and simultaneously receive another signal which is OFDM-modulated.

In accordance with an embodiment of the present invention, a method is provided for processing a received orthogonal frequency division multiplexing (OFDM) signal at a receiver, wherein said signal has been distorted by one or more transmission bursts from a transmitter. The method comprises generating a phase compensated OFDM signal based upon a pre-fast fourier transform (pre-FFT) phase progression estimate and information regarding timing of the one or more transmission bursts.

In accordance with another embodiment of the present invention, a device is provided including an OFDM receiver and a non-OFDM transmitter. The OFDM receiver processes a received orthogonal frequency division multiplexing (OFDM) signal, wherein said signal as received has been distorted by one or more transmission bursts from the transmitter. The OFDM receiver generates a phase compensated OFDM signal based upon a pre-fast fourier transform (pre-FFT) phase progression estimate and information regarding timing of the one or more transmission bursts.

Preferably, the information regarding timing of the one or more transmission bursts includes a start time and an end time of a transmission burst occurring during an OFDM symbol In accordance with further aspects of the above embodiments, the step of generating comprises determining an estimated phase change for the OFDM symbol at the end time based on the pre-FFT phase progression estimate of the OFDM symbol. An estimated phase of the received OFDM signal over n samples can then be determined by estimating the phase $\hat{\phi}_{l,n}$ of the received OFDM signal at the end time ($\hat{\phi}_{l,end}$) as $\hat{\phi}_{l,end} = \hat{\phi}_{l,start} + \Delta\hat{\phi}_l$, where l is a symbol number of said symbol, $\hat{\phi}_{l,start}$ is the estimated phase of the received signal at the start time, and $\Delta\hat{\phi}_l$ is the an estimated phase change for the OFDM symbol at the end time based on the pre-FFT phase progression estimate of the OFDM symbol.

The pre-FFT phase progression estimate ($\Delta\hat{\phi}_l$) can be defined as $$\Delta\hat{\phi}_l = \arg\left\{\sum_{n=N}^{N+Ng-1} r_{l,n} \cdot r^*_{l,n-N}\right\}$$

where r is the received OFDM signal, r* is the complex conjugate of the received OFDM signal r, N is the number of samples n between a beginning of the guard interval (GI) and a beginning of the latter segment (LS), and l is an OFDM symbol number of said symbol.

In accordance with a further aspect of the above-referenced embodiments, blind sector phase compensation can be provided. In accordance with this feature, if a transmission burst occurs during a period between a midpoint of the latter segment of the symbol and a midpoint of the guard interval of a next symbol (the blind sector), the generating step further comprises determining an estimated phase of the received signal between the midpoint of the latter segment of the symbol and the midpoint of the guard interval of a next symbol based upon a trajectory of the estimated phase during a time interval immediately prior to the midpoint of the latter segment.

In accordance with another embodiment of the present invention, an apparatus is provided for generating a corrected orthogonal frequency division multiplexing (OFDM) signal based on a received OFDM signal at a receiver, wherein said received signal has been distorted by one or more transmission bursts from a transmitter. The apparatus includes a correlation component, a phase estimation component, and a phase compensation component.

The correlation component includes a memory and a complex-valued correlator multiply and accumulate (MAC). The MAC receives as input $r_{l,n}$ and $r^*_{l,n-N}$, where r is the received OFDM signal, r* is the complex conjugate of the received OFDM signal r, N is the number of samples n between a beginning of the guard interval and a beginning of the latter segment, and l is an OFDM symbol number.

The phase estimation component includes an argument generator coupled to an output of the MAC of the correlation component. The argument generator outputs a pre-FFT phase progression estimate ($\Delta\hat{\phi}$) wherein:

$$\Delta \hat{\varphi}_l = \arg \left\{ \sum_{n=N}^{N+Ng-1} r_{l,n} \cdot r_{l,n-N}^* \right\}$$

The phase estimation component generates an estimated phase trajectory $\hat{\phi}_{l,n}$ of the received OFDM signal based upon the pre-FFT phase progression estimate and information regarding timing of the one or more transmission bursts.

The phase compensation receives the estimated phase trajectory $\hat{\phi}_{l,n}$ from the phase estimation component and the received signal $r_{l,n}$ from the correlation component, and generates a compensated OFDM signal $r_{l,n}{}^{(c)} = \exp(-j2\pi\hat{\phi}_{l,n}) \cdot r_{l,n}$.

The various embodiments of the present invention will now be described in further detail with reference to the drawings.

As explained above, in accordance with the present invention, an apparatus and method is provided to compensating for frequency/phase pulling bursts in an OFDM signal. This problem typically arises in multimode devices which transmit a bursty signal and simultaneously receive another signal which is OFDM-modulated.

In this regard, multimode handheld devices can contain embedded modules which support cellular services, e.g., speech via GSM, and other services, e.g., reception of DVB-T/H digital television or IP datastreams. A transmission burst from one of these services on a device can disturb the receipt and processing of an OFDM signal for another service on the device.

During the cellular transmit phase of a transmitter for one service, the OFDM signal received on the receiver for another service may be affected in several ways. For example, RF signals from the transmitter ("Tx") may leak into the receiver (e.g. blocking), or a bursty Tx load may alter the supply voltage of the receiver. While blocking is usually addressed by band rejection filtering, dynamic power supply modulation is more difficult to handle.

Although supply voltage variations are usually suppressed by low drop-out (LDO) regulators, a residual voltage "droop" often remains, especially in highly integrated handsets where all embedded terminals receive their power from a single battery. This effect may disturb vital receiver functions, in particular, local oscillators (LO) whose instantaneous frequency and phase are pulled by power supply modulation.

Figure 1:
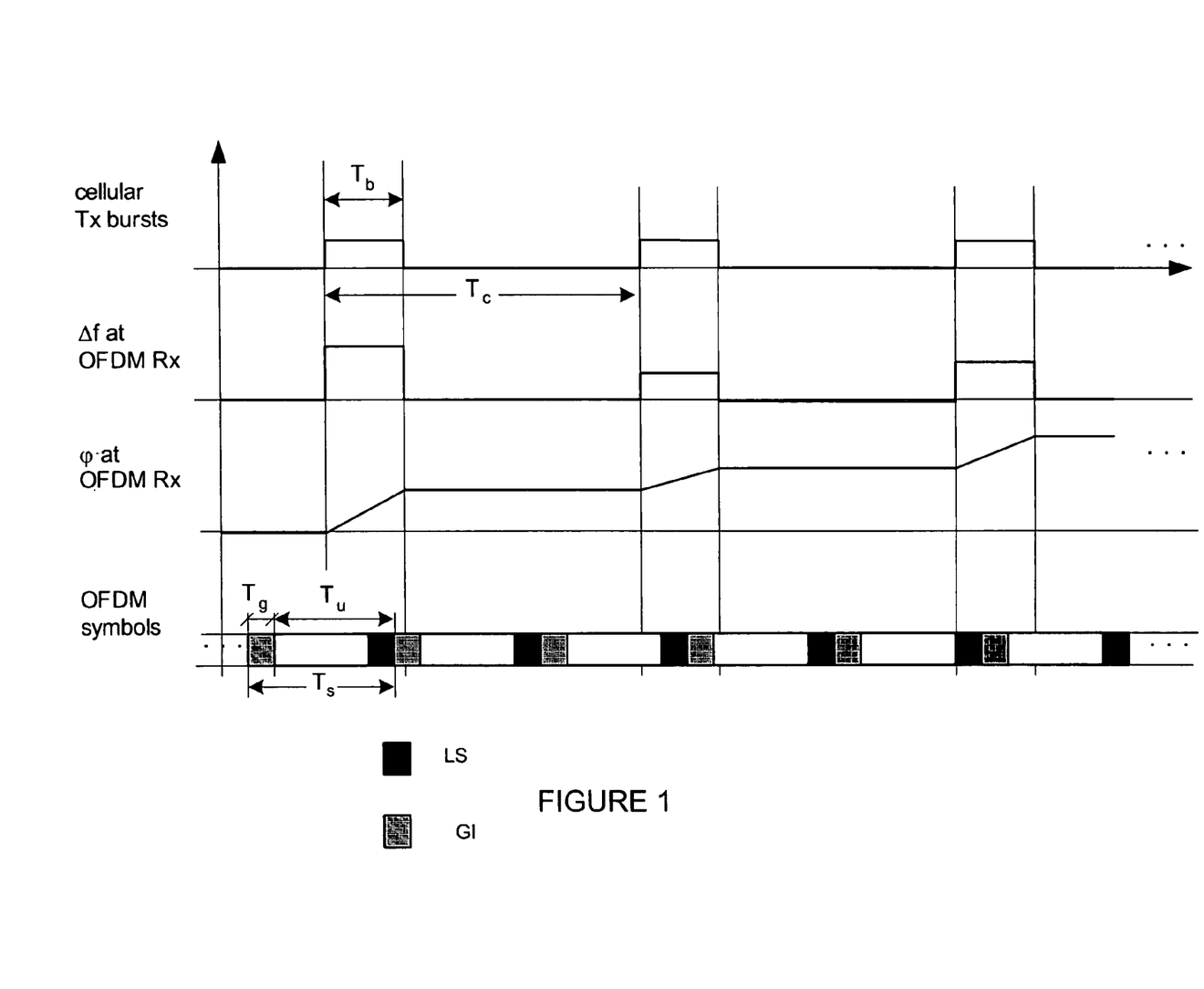
FIG. 1 illustrates a frequency/phase effect due to power supply voltage variation.

This problem is illustrated in FIG. 1, which shows the dominant frequency/phase effect due to power supply voltage variation. It should be noted that FIG. 1 is a simple case, and that additional phase steps as well as rise/fall transients may also be present. In any event, it has been found that a typical (residual) voltage droop of 100 mV may cause crystal frequency pulling in the order of 0.1 ppm or more. Embedded radios operating in the UHF range (such as a DVB-T/H receiver) therefore suffer from a bursty frequency pulling pattern with frequency offsets ($\Delta f$) in the order of 100 Hz or more. As typical cellular burst lengths are in the range of several hundred microseconds, these frequency offsets translate into fast phase shifts on the order of several tens of degrees per Tx burst. These phase shifts significantly disturb OFDM channel estimation and detection.

In general, the transmit bursts (Tx) and the received OFDM symbols are asynchronous. Moreover, the frequency shift $\Delta f$ may be different for each burst (e.g., due to Tx power control).

As the frequency/phase trajectories undergo abrupt changes within OFDM symbol intervals, we focus on frequency/phase estimation and correaction methods operating in the time domain. Such pre-FFT schemes cannot rely on pilots and therefore exploit the time-domain structure of the OFDM signal, e.g., the fact that the transmitted guard interval (GI) is a copy of the latter segment (LS) of the OFDM symbol. As explained above, the GI (guard interval) is a cyclic prefix. GI is a copy of the last part of the OFDM signal (LS) and is transmitted before the effective part of the symbol. Thus, in an OFDM signal, the received GI and LS segments should be identical. However, in the case of a supply voltage droop caused by a bursty Tx load, the received GI and LS segments, as interpreted by the receiver, are distorted by multipath and phase rotation.

FIG. 1 includes, from top to bottom, plots of:
1) a transmission burst (Tx burst) from a cellular transmitter;
2) a change in frequency ($\Delta f$) at an OFDM receiver (OFDM Rx) which is caused by the Tx burst;
3) a phase trajectory ($\phi$) at OFDM Rx which is caused by the Tx burst;
4) the OFDM symbols at OFDM Rx.

In FIG. 1, $T_b$ is the time period of the transmission burst (Tx burst) from the cellular transmitter, and $T_c$ is the interval (which can be asynchronous) between Tx bursts. The corresponding change in frequency ($\Delta f$) and phase ($\phi$) is plotted. As explained above, the change in frequency ($\Delta f$) can be different for each Tx burst. FIG. 1 illustrates six (6) OFDM signals, each having a symbol duration $T_s$. Each symbol includes a guard interval (GI) and a latter segment (LS). Each guard interval (GI) has a duration ($T_g$), which extends over a number of samples $N_g$, followed by an effective part of the symbol (extending from the end of GI through the end of LS) having a duration $T_u$, which extends over a number of samples N.

As explained above, in an OFDM symbol, GI is identical to LS. However, due to the change in frequency/phase caused by the Tx burst, when the receiver Rx processes the ODFM symbol, GI will not be identical to LS.

This distortion of the received GI and LS segments multipath and phase rotation has been addressed in a known pre-FFT algorithm for carrier frequency acquisition, described, for example, in F. Daffara and O. Adami, "A novel carrier recovery technique for orthogonal multicarrier system," Eur. Trans. Telecommun., vol. 8, no. 4, pp. 323-334 (July 1996); J. van de Beek, M. Sandell, and P. Börjesson, "ML estimation of time and frequency offset in OFDM systems," IEEE Trans. Signal Processing, vol. 45, pp. 1800-1805 (July 1997); and M. Speth, S. Fechtel, G. Fock, and H. Meyr, "Optimum receiver design for wireless broad-band systems using OFDM—Part I," IEEE Trans. Commun., vol. 47, No. 11 (November 1999), incorporated herein by reference.

Figure 2:
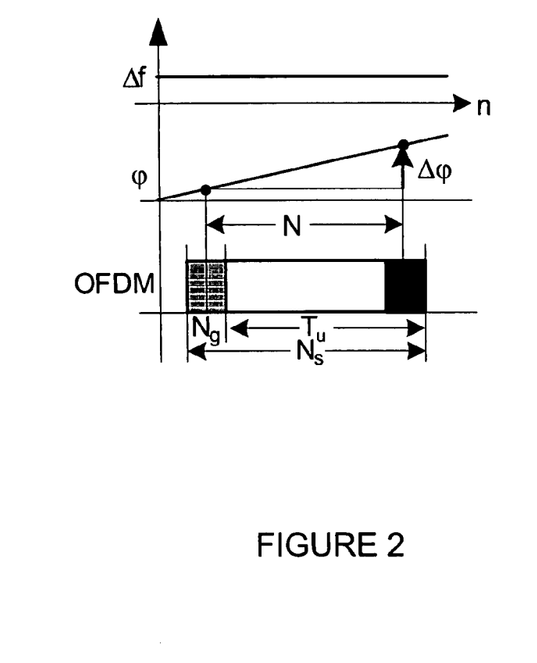
FIG. 2 illustrates a change ($\Delta\phi$) in phase ($\phi$) during a time interval of N samples (n) due to a change in frequency $\Delta f$.

FIG. 2 illustrates the change ($\Delta\phi$) in phase ($\phi$) during a time interval of N samples (n) due to a change in frequency $\Delta f$, wherein $N_g$ refers to the duration (in samples) of the guard interval (GI), $N_s$ refers to the duration (in samples) of the OFDM symbol, and $T_u$ refers to the useful OFDM symbol duration (over N samples).

Correlating the GI with the LS and taking the argument yields the estimated phase progression $\Delta\hat{\phi}$ within the useful OFDM symbol duration $T_u$ and the carrier frequency estimate $\Delta\hat{f} = \Delta\hat{\phi}/(2\pi T_u)$.

Despite multipath distortion, this type of frequency estimation has been found to be quite accurate (order of 1%), especially for long OFDM symbols (as in DVB-T/H). See, for example, M. Speth, S. Fechtel, G. Fock, and H. Meyr, "Optimum receiver design for wireless broad-band systems using OFDM—Part II: A case study," IEEE Trans. Commun., vol. 49, No. 4 (April 2001), incorporated by reference.

Figure 3:
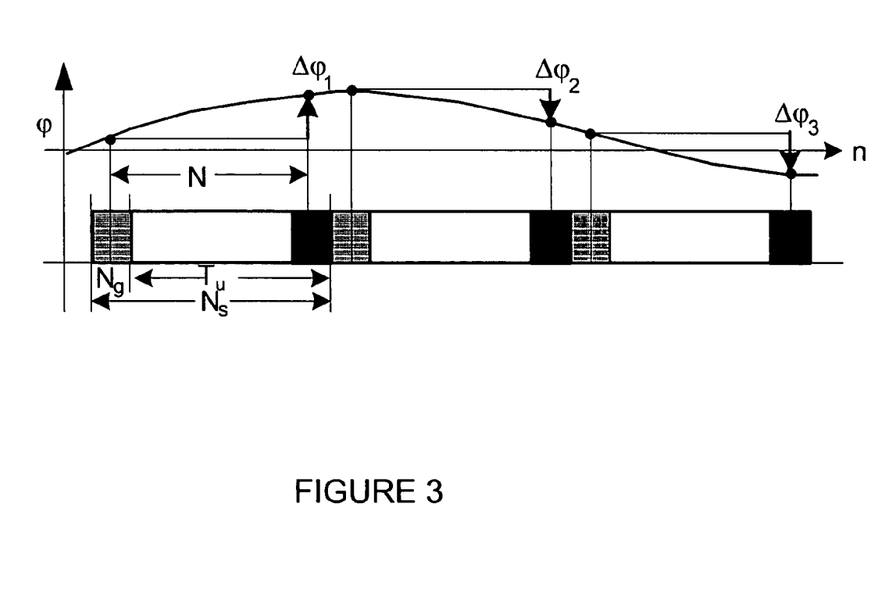
FIG. 3, shows a linear interpolation between estimated phase progression samples $\Delta\hat{\phi}_l$ for an OFDM signal.

Based on the same principle, an algorithm for pre-FFT phase tracking ("phase equalization") has been devised. Referring to FIG. 3, by linearly interpolating between estimated phase progression samples $\Delta\hat{\varphi}_l$ (OFDM symbol l=0, 1, 2, . . . ), the algorithm can follow and compensate for a time-variant phase trajectory (at least its lowpass components), thus mitigating the effect of Doppler and phase noise. In this regard, estimated phase progression samples $\Delta\hat{\varphi}_l$ are estimated as follows:

$$\Delta\hat{\varphi}_l = \arg\left\{\sum_{n=N}^{N+Ng-1} r_{l,n} \cdot r^*_{l,n-N}\right\} \quad \text{Equation 1}$$

where r is the received OFDM signal, r* is the complex conjugate of the signal r, N is the number of samples in $T_u$, and l is the OFDM symbol number. As illustrated in FIG. 3, since LS and GI have the same duration, for a given symbol, sample n=N will correspond to the beginning of LS.

As such, in Equation 1, for any symbol l, when n=N, $r_{l,n} \cdot r^*_{l,n-N}$ is $r_{l,N} \cdot r^*_{l,0}$ thus multiplying the received signal at n=N (the beginning of LS) with the complex conjugate of the received signal at n=0 (the beginning of GI). Similarly, for any symbol l, when n=N+Ng-1, $r_{l,n} \cdot r^*_{l,n-N}$ is $r_{l,N+Ng-1} \cdot r^*_{l,Ng-1}$ thus multiplying the received signal at n=N+Ng-1 (the end of LS) with the complex conjugate of the received signal at n=NG-1 (the end of GI).

In accordance with an embodiment of the present invention, a frequency/phase shift in a received OFDM signal at a receiver Rx of a multimode device which is caused by a bursty transmission from a transmitter Tx of the multimode device is compensated for by applying i) a pre-FFT phase progression estimation in accordance, for example, with Equation 1, and ii) timing information on the interfering Tx bursts.

This frequency/phase burst estimation/compensation technique is based on pre-FFT phase estimation and the availability of accurate Tx burst timing information (on/off switching instants) in the OFDM receiver.

Figure 4:
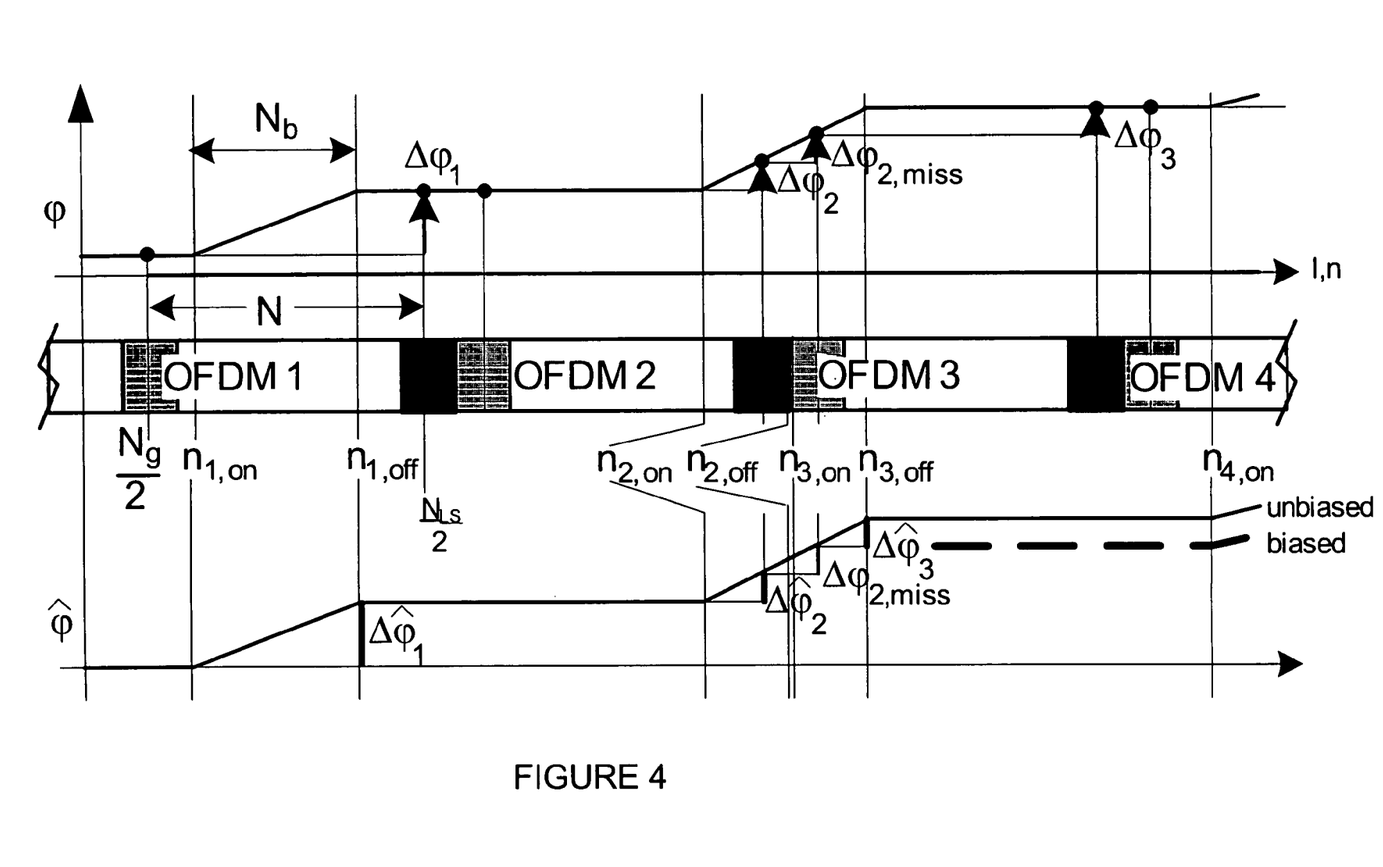
FIG. 4 illustrates an implementation of an embodiment of the present invention which includes blind-sector bias compensation.

As an example, we will illustrate a simple case, where frequency shifting bursts are essentially rectangular (Δf constant during a Tx burst) so that the phase φ(t) follows a piecewise linear characteristic Referring to FIG. 4, the known burst timing on the OFDM scale l,n (symbol index l=0, 1, 2, . . . , sample index n=0, . . . , Ng+N-1) is represented by on- and off-switching instants $n_{l,on}$ and $n_{l,off}$. Tx bursts stretching across two (or more) symbols are mathematically split into partial bursts beginning or ending at OFDM symbol boundaries.

Unbiased phase estimation is based upon the existence of a unique relation between the (observable) phase progression sample $\Delta\varphi_l$ and the (actual) phase trajectory $\varphi_{l,n}$ (apart from an irrelevant static phase offset).

In a strict sense, this would require that i) each OFDM symbol is hit by no more than one Tx burst (true if $T_c - T_b \geq T_s$), ii) phase progressions can be attributed solely to Tx bursts, and iii) the Tx burst does not stretch across "blind sectors" at OFDM symbol boundaries.

These conditions, however, can be relaxed for a number of special cases. For example, violation of i) is permissible if the frequency offset Δf is effectively constant for the duration of an OFDM symbol, restriction ii) can be overcome by algorithms for separating phase shifts from certain other sources from phase shifts due to a Tx burst (discussed below), and condition iii) can be compensated for with blind-sector bias compensation (discussed below).

This last condition (iii) reflects the fact that correlation-based pre-FFT phase estimation does not detect phase changes within blind sectors (second half of LS and first half of GI). Missing some portions ($\Delta\varphi_{l,miss}$) of the phase progression, however, renders phase estimation biased. Considering that Tx bursts may hit OFDM symbol boundaries quite frequently, restoration of the missed portions is highly desirable in order to prevent (or mitigate) phase discontinuities in OFDM channel estimation and detection. Therefore, in accordance with further embodiments of the present invention, blind-sector bias compensation is provided.

FIG. 4 illustrates an implementation of an embodiment of the present invention which includes blind-sector bias compensation. FIG. 4 shows 4 OFDM symbols (OFDM 1, OFDM 2, OFDM 3, OFDM 4). For OFDM 1, the midpoint of the GI is labelled Ng/2 and the midpoint of LS is labelled $N_{LS}/2$. These midpoints are also delimited with unlabelled vertical lines in OFDM 2, OFDM 3, and OFDM 4. Beginning on the left side of FIG. 4, a Tx burst of duration $N_b$ begins at a time $n_{1,on}$ and ends at a time $n_{1,off}$. The phase trajectory (φ) of the signal (r) at the receiver is plotted above the OFDM symbols. As illustrated, the Tx burst between $n_{1,on}$ and $n_{1,off}$ causes a change in phase $\Delta\varphi_l$ during the duration $N_b$. The estimated phase trajectory $\hat{\varphi}$ is plotted based on $$\Delta\hat{\varphi}_l = \arg\left\{\sum_{n=N}^{N+Ng-1} r_{l,n} \cdot r^*_{l,n-N}\right\} \quad \text{(equation 1)}$$

where $\Delta\hat{\varphi}_l$, is the estimated phase change due to the Tx burst between $n_{1,on}$ and $n_{1,off}$.

As explained above, the term blind sector, as used herein, refers to the time period beginning at the midpoint of LS in one symbol (e.g., the midpoint of LS of OFDM 1) to the midpoint of GI in the next symbol (e.g., the midpoint of GI of OFDM 2).

As such, the Tx burst between $n_{1,on}$ and $n_{1,off}$ does not pass through a blind sector.

A second Tx burst extends from at time $n_{2,on}$ in OFDM 2 to a time and $n_{3,off}$ in OFDM 3. As explained above, in accordance with the present invention, Tx bursts which pass from one OFDM symbol to another OFDM symbol are preferably separated, for purposes of analysis, into two bursts, the first burst terminating at the boundary of the first and second symbols, and the second burst beginning at the boundary of the first symbol and second symbols. As such, the above-referenced burst is divided into a first Tx burst which extends from at time $n_{2,on}$ to a time and $n_{2,off}$, and a second Tx burst which extends from a time $n_{3,on}$ to a time and $n_{3,off}$. In this regard, we note that preferably, $n_{2,off}$ and $n_{3,on}$ occur at substantially the same time. As such, the Tx burst which extends from at time $n_{2,on}$ to a time and $n_{2,off}$ passes through a blind sector extending from the midpoint of LS in OFDM 2 to $n_{2,off}$, and the Tx burst which extends from a time $n_{3,on}$ to a time $n_{3,off}$ passes through a blind sector extending from $n_{3,on}$ to the midpoint of GI in OFDM 3. As explained below, this can, for purposes of calculating the estimated phase trajectory $\hat{\varphi}$ be treated as a single blind sector extending from the midpoint of LS in OFDM 2 to the midpoint of GI in OFDM 3.

Referring to FIG. 4, the Tx burst from $n_{2,on}$ to the midpoint of LS in OFDM 2 causes a phase change $\Delta\varphi_2$ which is estimated as $\Delta\hat{\varphi}_2$ based on Equation 1. This yields an estimated phase trajectory $\hat{\varphi}$ between $n_{2,on}$ and the midpoint of LS in OFDM 2. However, the Tx burst extends past the midpoint of LS into the blind sector between the midpoint of LS of OFDM 2 to the midpoint of GI in OFDM 3. A blind sector compensation is therefore applied.

Preferably, the blind sector compensation estimates the phase change during the blind sector $\Delta\hat{\varphi}_{2,miss}$ based on the phase change in the preceding portion of the Tx burst. Most preferably, the slope of $\hat{\varphi}$ during the blind sector is set as the (averaged) phase slope $s_f = 2\pi\Delta f_l T_s$ (radians per sample during sampling duration $T_s$). Continuing with the example of FIG. 4, the Tx burst continues past the blind sector, from the midpoint of GI through to $n_{3,off}$. The Tx burst from the midpoint of GI to $n_{3,off}$ in OFDM 3 causes a phase change $\Delta\varphi_3$ which is estimated as $\Delta\hat{\varphi}3$ based on Equation 1. This yields an estimated phase trajectory $\hat{\varphi}$ between the midpoint of GI to $n_{3,off}$. This trajectory is labelled "unbiased" because blind sector compensation has been applied. Also illustrated (as a dashed line) is the trajectory without blind sector compensation (labelled "biased").

In accordance with a further aspect of the embodiment of the present invention outlined above, a frequency/phase burst estimation/compensation technique is provided, comprising the following steps:

i) generation of phase progression estimate $\Delta\hat{\varphi}_l$ via pre-FFT correlation (LS and GI):

$$\Delta\hat{\varphi}_l = \arg\left\{\sum_{n=N}^{N+Ng-1} r_{l,n} \cdot r^*_{l,n-N}\right\}$$

ii) reconstruction of phase trajectory estimate $\hat{\varphi}_{l,n}$ from phase progression estimate $\Delta\hat{\varphi}_l$, preferably including blind sector bias compensation;

iii) phase compensation (back-rotation), using the estimated phase trajectory $\hat{\varphi}_{l,n}$ $$r_{l,n}^{(c)} = \exp(-j2\pi\hat{\varphi}_{l,n}) \cdot r_{l,n}$$

where $r^{(c)}_{l,n}$ is the compensated received signal.

The frequency/phase burst estimation/compensation technique in accordance with various embodiments of the present invention has a number of advantages. In particular, burst frequency/phase estimation/compensation processing in accordance with the embodiments of the present invention can be performed solely in the time domain (pre-FFT) before OFDM demodulation (FFT). In addition, the method in accordance with various embodiments of the present invention can perform immediate burst frequency/phase compensation on a per-OFDM-symbol basis. In other words, phase correaction can be applied to the same OFDM symbol which has been used for phase estimation. Further, provided that a unique relation between phase progression $\Delta\varphi_l$ and phase trajectory $\varphi_{l,n}$ exists or can be re-established, the embodiments of the present invention can be adapted to any Tx burst pattern (timing instants, length $T_b$, period $T_c$). This is the case for many relevant applications, including GSM/GPRS and DVB-T/H where the Tx silence period $(T_c - T_b) = (4.6 - 0.577)$ ms exceeds the OFDM symbol duration $T_s \leq 1.1$ ms.

It should also be noted that provided that the unique relation between $\Delta\varphi_l$ and $\varphi_{l,n}$ remains intact, the interfering burst parameters (length $T_b$, period $T_c$) can be time-varying (as, e.g., in WLAN).

In accordance with a further embodiment of the present invention, intersymbol interference (ISI) adversely affecting the correlator output ($r^{(c)}_{l,n}$) can be reduced by shortening the summation, e.g., from n=N, . . . ,N+N-1 to n=N+Ni, . . . ,N+Ng-1 (i.e., dropping the first Ni samples, wherein Ni is the duration, in samples of the intersymbol interference).

In accordance with another variant of the present invention, in applications where additional characteristics of the structure of the intra-burst frequency/phase pattern (rise/fall transients, frequency droop, additional phase steps, etc.) are known, these characteristics can be considered when calculating the phase trajectory estimate $\Delta\hat{\varphi}_{l,n}$ In accordance with another aspect of the present invention, frequency/phase offset samples $\Delta\hat{\varphi}_l$ collected under quiescent conditions (OFDM symbols free from Tx interference) can be used for regular frequency/phase tracking.

Moreover, if the burst frequency shift $\Delta f$ is known to be time-invariant or changing very slowly, smoothing can be applied to the sequence $\{\Delta\hat{\varphi}_{l,burst}\}$ of phase progression estimates $\Delta\hat{\varphi}_l$ before reconstructing the phase $\hat{\varphi}_{l,n}$.

If, in addition to burst frequency shifts $\Delta f$, significant Doppler or phase noise is present, the two respective phase trajectories are superimposed. Therefore, it would be desirable to separate the phase changes due to doppler and other phase noise from phase changes due to a Tx burst. If the phase trajectory caused by Doppler and/or phase noise is sufficiently smooth and the silence period in between interfering Tx bursts is sufficiently large, then $\Delta\hat{\varphi}_l$ for the quiescent OFDM symbols surrounding the symbol(s) hit by a burst—which include phase changes due to doppler and other phase noise but not Tx bursts—can be used (e.g., by smoothing) to discriminate the part $\Delta\hat{\varphi}_{l,burst}$ attributed to the Tx burst from the part $\Delta\hat{\varphi}_{l,Doppler/PN}$ attributed to Doppler/phase noise.

In addition, for MIMO (Multiple Input Multiple Output) reception with a single frequency reference controlling all Nrx receiver chains, frequency/phase estimation can be improved by using received signals $r_{r,l,n}$ (r=1, . . . ,Nrx) of all Nrx Rx chains (or a subset thereof) in phase progression estimation, e.g., via correlation $$\Delta\hat{\varphi}_l = \arg\left\{\sum_{n=N}^{N+Ng-1} \sum_{r=1}^{Nrx} r_{r,l,n} \cdot r^*_{r,l,n-N}\right\}.$$

An exemplary apparatus for implementing an embodiment of the present invention will now be described with respect to FIG. 5. The apparatus includes a correlation component, a phase estimation component, and a phase compensation component. An OFDM signal r is received from an analog to digital converter (ADC) at the correlation component, and corrected signal $r_c$ is output from the phase compensation component.

The correlation component includes a memory and a complex valued correlator MAC (multiply and accumulator) labeled "accu". The memory stores up to N+Ng complex samples of one OFDM symbol and acts as a FIFO during correlation. Preferably, this memory is shared with the FFT input memory. In any event, MAC receives as input $r_{l,n}$ and $r^*_{l,n-N}$, and provides an output to "arg" in the phase estimation component, which generates the argument $$\Delta\hat{\varphi}_l = \arg\left\{\sum_{n=N}^{N+Ng-1} \sum_{r=1}^{Nrx} r_{r,l,n} \cdot r^*_{r,l,n-N}\right\}.$$

The complex-valued correlator MAC ("accu") is active at least while receiving the Ng last samples of an OFDM symbol. Generation of the argument ("arg") can be performed, for example, by the well known CORDIC (COordinate Rotation DIgital Computer) algorithm. The quantized phase samples generated by a phase trajectory estimation function can then be used for addressing a look-up table (LUT) whose stored phasor samples are suitably quantized in amplitude and phase. The phasors output from the LUT and the input samples retrieved from FFT input memory are input into a multiplier to phase-correct the input samples retrieved from FFT input memory, resulting in a signal $r^{(c)}_{l,n}$. In this regard, the multiplier only needs to process the N useful samples (Ng guard interval samples dropped). In order to minimize delay, phase correaction is preferably done during processing the first FFT stage. The phase compensation hardware (LUT, multiplier) can be shared with regular carrier frequency synchronization. As such, implementing the frequency/phase burst estimation/compensation techniques in accordance with the present invention requires no significant additional hardware and small additional latency.

Figure 5:
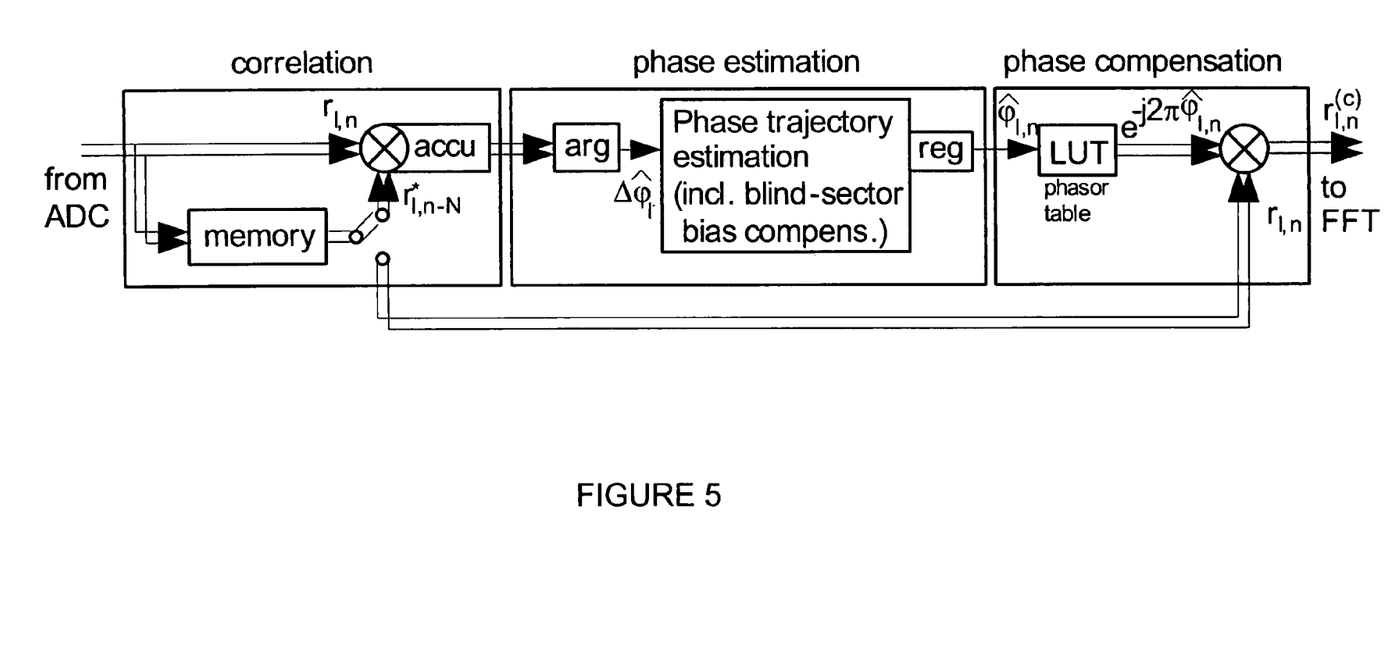
FIG. 5 shows an exemplary apparatus for implementing an embodiment of the present invention.

It should noted that the various components of FIG. 5 can be implemented in hardware, software or a combination thereof. For example, the complex valued correlator MAC, the argument generator, and the multiplier, can be implemented as dedicated hardware devices, or as software executing on a microprocessor. Further, although FIG. 5 illustrates the memory of the correlation component connected via a switch to the look up table (LUT) in the phase compensation component, it should be appreciated that both could be implemented in a single memory.

Figure 6:
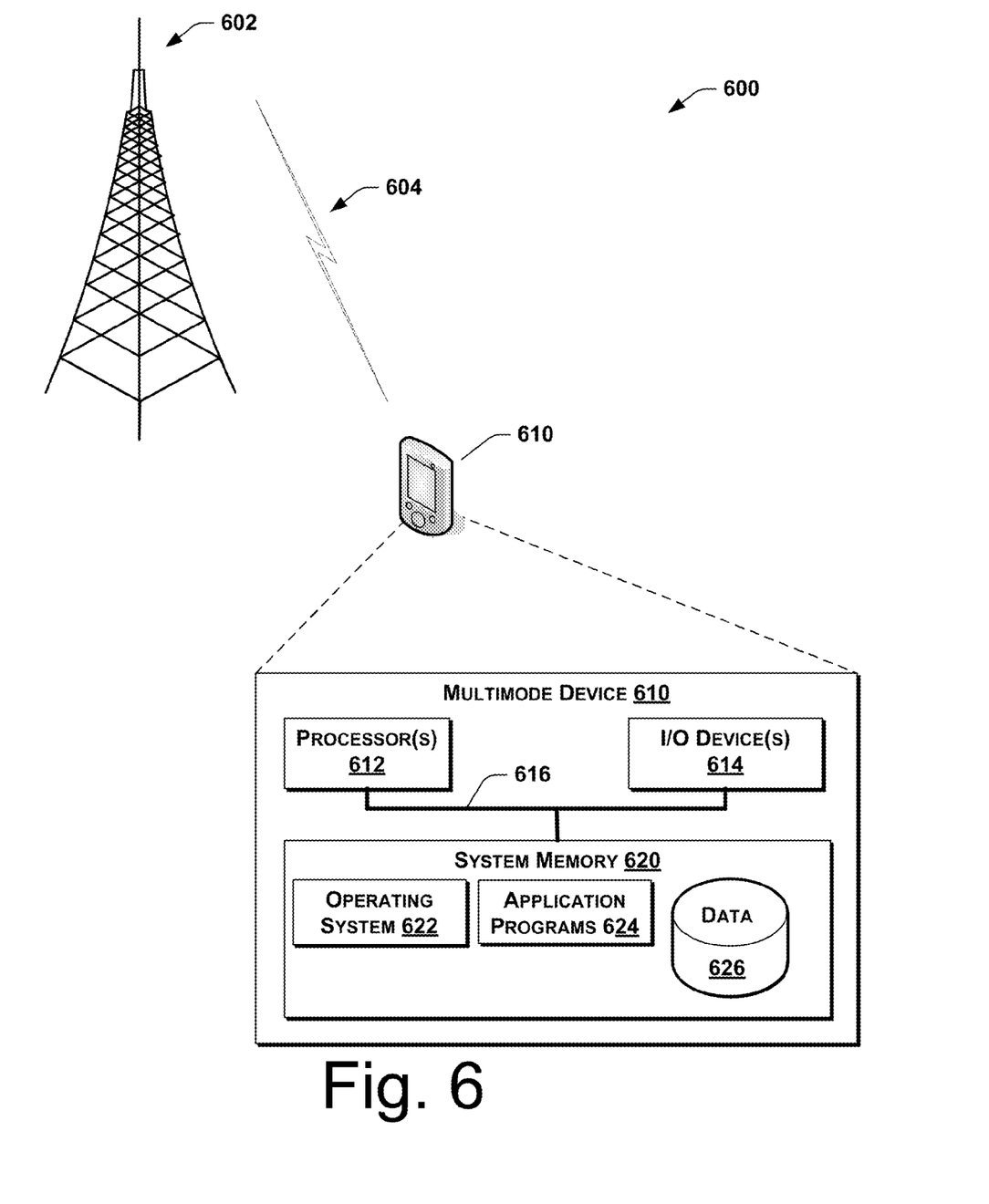
FIG. 6 illustrates an example apparatus that includes I/O devices such as a transmitter, a receiver, or a transceiver according to an embodiment of the present invention.

FIG. 6 illustrates an exemplary environment 600 that includes a wireless communication source 602 that is configured to provide and receive communications signals 604 from a multimode device 610. In the representative environment 600, the multimode device is a hand-held device, such as an MP3 (Moving Picture Exerts Group Layer-3) player, a personal data assistant (PDA), a global positioning system (GPS), a cell phone, or other similar hand-held devices. In alternative implementations, of course, the multimode device 110 may include any other suitable devices that receive or transmit information that operate in accordance with the teachings of the present disclosure.

As further shown in FIG. 6, the multimode device 110 includes one or more I/O devices 614 (e.g. transmitters, receivers, transceivers. etc.), a processor 612, and a system memory 620 all integrated together by a system bus 116.

The I/O device 614 permits the multimode device to transmit and receive signals 604 as disclosed above. In one implementation. the I/O device 614 may include the hardware or software required to implement the exemplary apparatus discussed in FIG. 5. Also, the I/O component 614 may be configured to operatively communicate with one or more external networks, such as a cellular telephone network, a satellite network, an information network (e.g. internet, intranet, cellular network, cable network, fiber optic network, LAN, WAN, etc.), an infrared or radio wave communication network, or any other suitable network.

The system bus 116 of the multimode device 610 represents any of the several types of bus structures, including a memory bus or a memory controller, a peripheral bus, an accelerated graphics port, and a processor or local bus using any of a variety of bus architectures.

The system memory 620 may include computer-readable media configured to store data and/or program modules for implementing the techniques disclosed herein that are immediately accessible to and/or presently operated on by the processor 612. For example, the system memory 620 may also store an operating system (BIOS) and application programs 624 that can be accessed by the processor 612 for performing various tasks desired by a user of the multimode device 610.

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. A method comprising:
   processing a received orthogonal frequency division multiplexing (OFDM) signal at a receiver on a device, wherein said signal has been distorted by one or more transmission bursts from a transmitter on the device; and
   generating a phase compensated OFDM signal based upon a pre-fast fourier transform (pre-FFT) phase progression estimate and information regarding a start time and an end time of the one or more transmission bursts.

2. The method of claim 1, wherein the information regarding timing of the one or more transmission bursts includes a start time and an end time of a transmission burst occurring during an OFDM symbol.

3. The method of claim 2, wherein said generating comprises determining an estimated phase change for the OFDM symbol at the end time based on the pre-FFT phase progression estimate of the OFDM symbol.

4. The method of claim 3, wherein said generating further comprises determining an estimated phase of the received OFDM signal over n samples by estimating the phase $\hat{\phi}_{l,n}$ of the received OFDM signal at the end time ($\hat{\phi}_{l,end}$) as $\hat{\phi}_{l,end} = \hat{\phi}_{l,start} + \Delta\hat{\phi}_l$, where 1 is a symbol number of said symbol, and $\hat{\phi}_{l,start}$ is the estimated phase of the received signal at the start time, and $\Delta\hat{\phi}_l$ is the an estimated phase change for the OFDM symbol at the end time based on the pre-FFT phase progression estimate of the OFDM symbol.

5. The method of claim 4, wherein said generating further determining an estimated phase of the received OFDM signal between $\hat{\phi}_{l,start}$ and $\hat{\phi}_{l,end}$ via interpolation.

6. The method of claim 5, wherein said interpolation is linear interpolation.

7. The method of claim 5, further comprising the step of generating a corrected OFDM signal based upon the estimated phase of the received OFDM signal.

8. The method of claim 5, wherein, if a transmission burst occurs during a period between a midpoint of the latter segment of the symbol and a midpoint of the guard interval of a next symbol, the generating step further comprises determining an estimated phase of the received signal between the midpoint of the latter segment of the symbol and the midpoint of the guard interval of a next symbol based upon a trajectory of the estimated phase during a time interval immediately prior to the midpoint of the latter segment.

9. The method of claim 3, wherein the pre-FFT phase progression estimate is determined as a function of: i) the received OFDM signal during a guard interval and a latter segment of an OFDM symbol; and ii) a complex conjugate of the received OFDM signal during the guard interval and the latter segment of the OFDM symbol.

10. The method of claim 9, wherein the pre-FFT phase progression estimate ($\Delta\hat{\phi}_l$) is defined as:

$$\Delta\hat{\varphi}_l = \arg\left\{\sum_{n=N}^{N+Ng-1} r_{l,n} \cdot r^*_{l,n-N}\right\}$$

where r is the received OFDM signal, r* is the complex conjugate of the received OFDM signal r, N is the number of samples n between a beginning of the guard interval and a beginning of the latter segment, and l is an OFDM symbol number of said symbol.

11. The method of claim 10, wherein said generating further comprises determining an estimated phase of the received OFDM signal over n samples by estimating the phase $\hat{\varphi}_{l,n}$ of the received OFDM signal at the end time ($\hat{\varphi}_{l,end}$) as $\hat{\varphi}_{l,end} = \hat{\varphi}_{l,start} + \Delta\hat{\varphi}_l$, where l is a symbol number of said symbol, and $\Delta_{l,start}$ is the estimated phase of the received signal at the start time.

12. The method of claim 11, wherein said generating further determining an estimated phase of the received OFDM signal between $\hat{\varphi}_{l,start}$ and $\hat{\varphi}_{l,end}$ via interpolation.

13. The method of claim 12, wherein said interpolation is linear interpolation.

14. The method of claim 12, wherein, if a transmission burst occurs during a period between a midpoint of the latter segment of the symbol and a midpoint of the guard interval of a next symbol, the generating step further comprises determining an estimated phase of the received signal between the midpoint of the latter segment of the symbol and the midpoint of the guard interval of a next symbol based upon a trajectory of the estimated phase during a time interval immediately prior to the midpoint of the latter segment.

15. The method of claim 10, further comprising selectively applying a smoothing algorithm to the pre-FFT phase progression estimate of the OFDM symbol based upon a predetermined selection criteria.

16. The method of claim 15, wherein the predetermined selection criteria includes a determination that a change in frequency of the transmission burst is substantially time-invariant.

17. A device including:
an OFDM receiver; and
a non-OFDM transmitter;
the OFDM receiver processing a received orthogonal frequency division multiplexing (OFDM) signal,
wherein said received OFDM signal has been distorted by one or more transmission bursts from the transmitter,
the OFDM receiver generating a phase compensated OFDM signal based upon a pre-fast fourier transform (pre-FFT) phase progression estimate and information regarding a start time and an end time of the one or more transmission bursts.

18. The device of claim 17, wherein the information regarding timing of the one or more transmission bursts includes a start time and an end time of a transmission burst occurring during the OFDM symbol.

19. The device of claim 18, wherein said OFDM receiver determines an estimated phase change for the OFDM symbol at the end time based on the pre-FFT phase progression estimate of the OFDM symbol.

20. The device of claim 19, wherein said OFDM receiver determines an estimated phase of the received OFDM signal over n samples by estimating the phase $\hat{\varphi}_{l,n}$ of the received OFDM signal at the end time ($\hat{\varphi}_{l,end}$) as $\hat{\varphi}_{l,end} = \hat{\varphi}_{l,start} + \Delta\hat{\varphi}_l$, where l is a symbol number of said symbol, and $\hat{\varphi}_{l,start}$ is the estimated phase of the received signal at the start time, and $\Delta\hat{\varphi}_l$ is the an estimated phase change for the OFDM symbol at the end time based on the pre-FFT phase progression estimate of the OFDM symbol.

21. The device of claim 20, wherein said OFDM receiver determines an estimated phase of the received OFDM signal between $\hat{\varphi}_{l,start}$ and $\hat{\varphi}_{l,end}$ via interpolation.

22. The device of claim 21, wherein said interpolation is linear interpolation.

23. The device of claim 21, wherein the OFDM receiver generates a corrected OFDM signal based upon the estimated phase of the received OFDM signal.

24. The device of claim 21, wherein, if a transmission burst occurs during a period between a midpoint of the latter segment of the symbol and a midpoint of the guard interval of a next symbol, the OFDM receiver determines an estimated phase of the received signal between the midpoint of the latter segment of the symbol and the midpoint of the guard interval of a next symbol based upon a trajectory of the estimated phase during a time interval immediately prior to the midpoint of the latter segment.

25. The device of claim 19, wherein the pre-FFT phase progression estimate is determined as a function of: i) the received OFDM signal during a guard interval and a latter segment of an OFDM symbol; and ii) a complex conjugate of the received OFDM signal during the guard interval and the latter segment of the OFDM symbol.

26. The device of claim 25, wherein the pre-FFT phase progression estimate ($\Delta\hat{\varphi}_l$) is defined as:

$$\Delta\hat{\varphi}_l = \arg\left\{\sum_{n=N}^{N+Ng-1} r_{l,n} \cdot r^*_{l,n-N}\right\}$$

where r is the received OFDM signal, r* is the complex conjugate of the received OFDM signal r, N is the number of samples n between a beginning of the guard interval and a beginning of the latter segment, and l is an OFDM symbol number of said symbol.

27. The device of claim 26, wherein said OFDM receiver determines an estimated phase of the received OFDM signal over n samples by estimating the phase $\hat{\varphi}_{l,n}$ of the received OFDM signal at the end time ($\hat{\varphi}_{l,end}$) as $\hat{\varphi}_{l,end} = \hat{\varphi}_{l,start} + \Delta\hat{\varphi}_l$, where l is a symbol number of said symbol, and $\hat{\varphi}_{l,start}$ is the estimated phase of the received signal at the start time.

28. The device of claim 27, wherein said OFDM receiver determines an estimated phase of the received OFDM signal between $\hat{\varphi}_{l,start}$ and $\hat{\varphi}_{l,end}$ via interpolation.

29. The device of claim 27, wherein said interpolation is linear interpolation.

30. The device of claim 27, wherein, if a transmission burst occurs during a period between a midpoint of the latter segment of the symbol and a midpoint of the guard interval of a next symbol, the OFDM receiver determines an estimated phase of the received signal between the midpoint of the latter segment of the symbol and the midpoint of the guard interval of a next symbol based upon a trajectory of the estimated phase during a time interval immediately prior to the midpoint of the latter segment.

31. The device of claim 26, wherein the OFDM receiver selectively applies a smoothing algorithm to the pre-FFT phase progression estimate of the OFDM symbol based upon a predetermined selection criteria.

32. The device of claim 31, wherein the predetermined selection criteria includes a determination that a change in frequency of the transmission burst is substantially time-invariant.

33. An apparatus for generating a corrected orthogonal frequency division multiplexing (OFDM) signal based on a received OFDM) signal at a receiver, wherein said received signal has been distorted by one or more transmission bursts from a transmitter, comprising:
- a correlation component, the correlation component including a memory and a complex-valued correlator multiply and accumulate (MAC), the MAC receiving as input $r_{l,n}$ and $r^*_{l,n-N}$, where r is the received OFDM signal, r* is the complex conjugate of the received OFDM signal r, N is the number of samples n between a beginning of a guard interval and a beginning of a latter segment, and l is an OFDM symbol number;
- a phase estimation component, the phase estimation component including an argument generator coupled to an output of the MAC of the correlation component, the argument generator outputting a pre-FFT phase progression estimate ($\Delta\hat{\varphi}_l$) wherein:

$$\Delta\hat{\varphi}_l = \arg\left\{\sum_{n=N}^{N+N_g-1} r_{l,n} \cdot r^*_{l,n-N}\right\}$$

the phase estimation component generating an estimated phase trajectory $\hat{\phi}_{l,n}$ of the received OFDM signal based upon the pre-FFT phase progression estimate and information regarding timing of the one or more transmission bursts; and
- a phase compensation component, the phase compensation receiving the estimated phase trajectory $\hat{\phi}_{l,n}$ from the phase estimation component and the received signal $r_{l,n}$ from the correlation component, the phase compensation component generating a compensated OFDM signal $r_{l,n}^{(c)} = \exp(-j2\pi\hat{\phi}_{l,n}) \cdot r_{l,n}$.

* * * * *